(No Model.) 3 Sheets—Sheet 1.
G. F. JOHNSON.
SEED PLANTER.
No. 353,949. Patented Dec. 7, 1886.
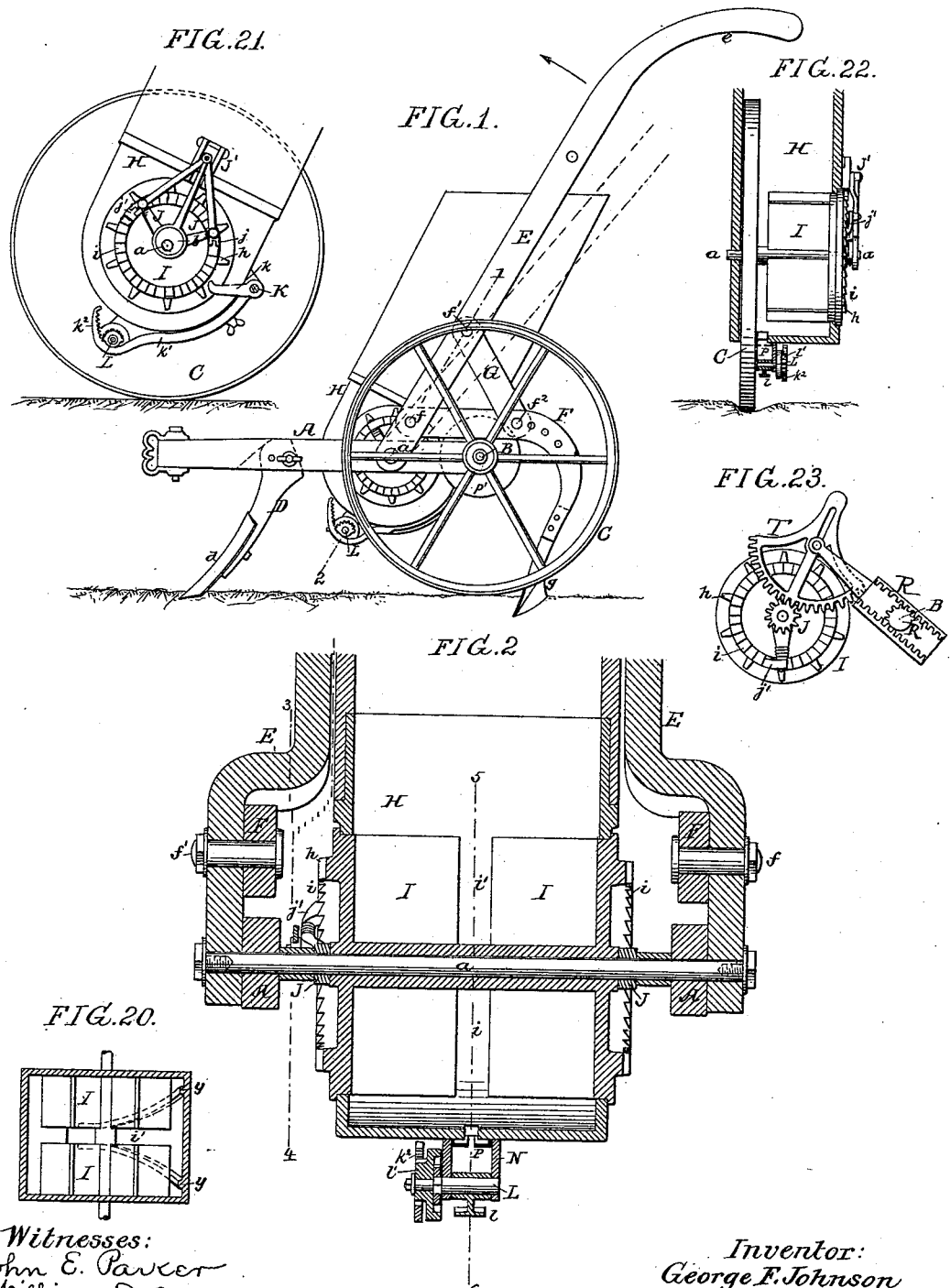
Witnesses:
John E. Parker
William D. Conner
Inventor:
George F. Johnson
by his Attorneys
Howson and Sons (No Model.) 3 Sheets—Sheet 2.
G. F. JOHNSON.
SEED PLANTER.
No. 353,949. Patented Dec. 7, 1886.
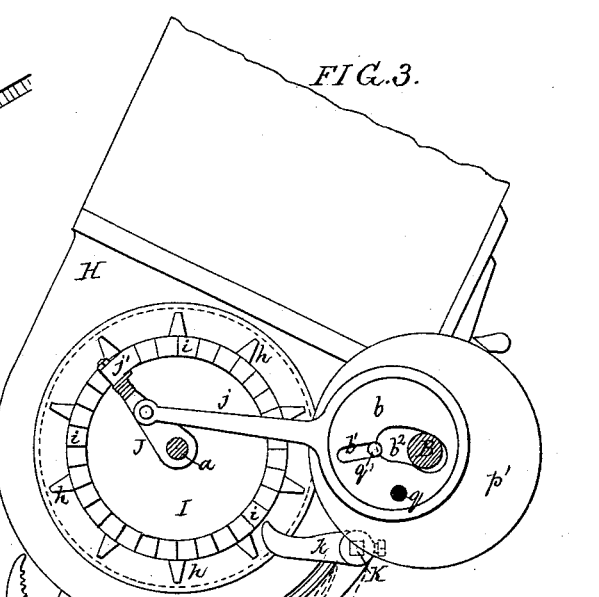
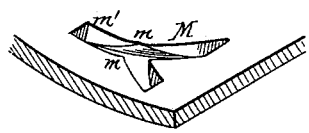
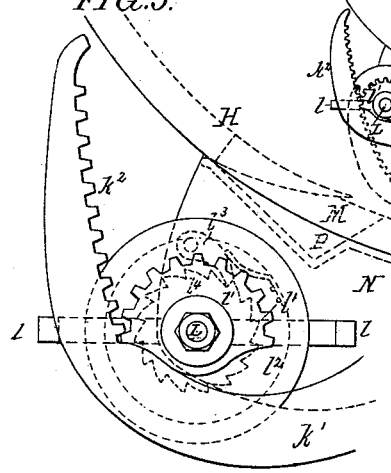
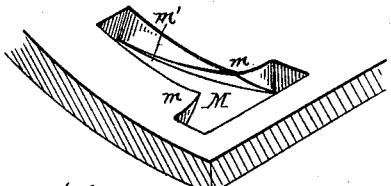
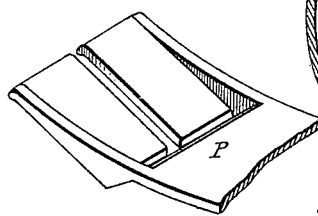
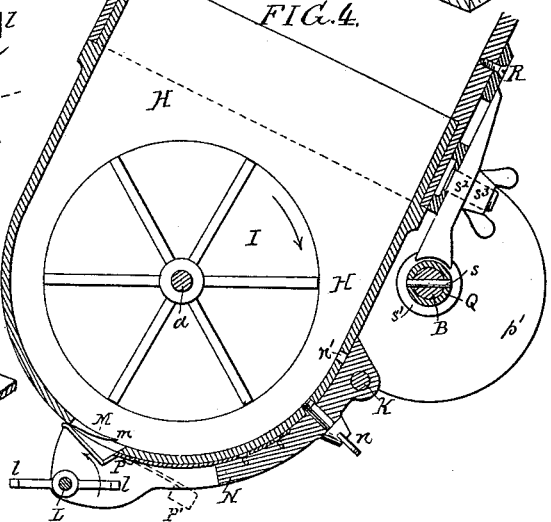
Witnesses:
John E. Parker
William D. Conner
Inventor:
George F. Johnson
by his Attorneys
Howton and Sons (No Model.)  3 Sheets—Sheet 3.

G. F. JOHNSON.
SEED PLANTER.

No. 353,949.  Patented Dec. 7, 1886.

Witnesses:
John E. Parker
William D. Conner

Inventor:
George F. Johnson
by his Attorneys
Howson and Son

UNITED STATES PATENT OFFICE.

GEORGE F. JOHNSON, OF PHILADELPHIA, PENNSYLVANIA.

SEED-PLANTER.

SPECIFICATION forming part of Letters Patent No. 353,949, dated December 7, 1886.

Application filed June 25, 1886. Serial No. 206,201. (No model.)

*To all whom it may concern:*

Be it known that I, GEORGE F. JOHNSON, a citizen of the United States, residing in Philadelphia, Pennsylvania, have invented certain Improvements in Seed-Planters, of which the following is a specification.

My invention relates to improvements in seed-planters, the device being more especially adapted for planting cotton-seed, the nature of which makes it very difficult to separate and plant at suitable intervals.

One of the main objects of my invention is to so construct the device that seed may be planted at any predetetermined distances apart; and a further object of my invention is to construct the frame so that it can be readily lifted over any brush or roots that may be in the path of the covering-points.

Figure 8:
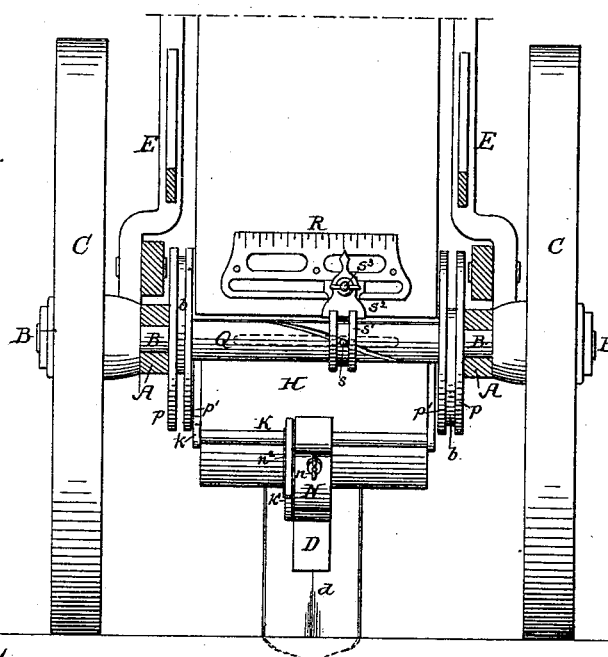
Figure 17:
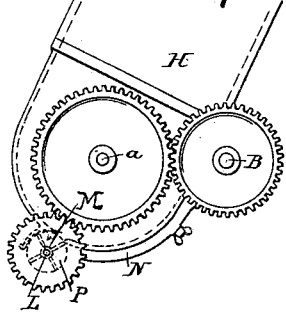
Figure 18:
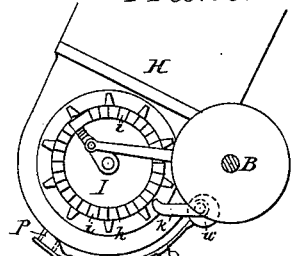
Figure 19:
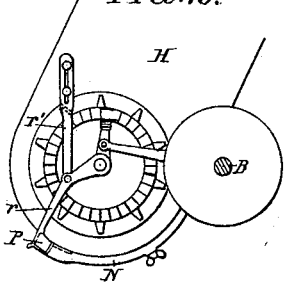

In the accompanying drawings, Figure 1 is a side view of my improved seed-planter. Fig. 2 is a transverse sectional view on the line 1 2, Fig. 1, but drawn to an enlarged scale. Fig. 3 is a sectional view on the line 3 4, Fig. 2. Fig. 4 is a sectional view on the line 5 6, Fig. 2. Fig. 5 is a detached view showing more clearly the cup and extractor and the devices for operating the latter. Fig. 6 is a detached perspective view of part of the seed-box, showing the form of slot I prefer to use. Fig. 7 is a detached perspective view of the spring-cup. Fig. 8 is a rear view of the lower portion of the machine, partly in section. Figs. 9 and 10 show modified forms of slot which may be used in the bottom of the box. Figs. 11, 12, 13, 14, 15, and 16 are views of different forms of blades which may be used in carrying out my invention. Figs. 17, 18, and 19 illustrate modifications of the planting-cup and mechanism connected therewith. Fig. 20 is a sectional plan view showing the back of the seed-box provided with tapering guides. Figs. 21 and 22 illustrate, in side view and section, respectively, a single-wheel machine provided with my improvements; and Fig. 23 is a view of a modification of the driving mechanism.

Referring to Figs. 1 to 8, A is the yoke-frame of the planter, provided with bearings for the shaft B, on which are mounted the traction-wheels C. Projecting from the under side of the forward part of the frame A is a post, D, to which is secured the furrow-opener $d$, and at the front end of the frame A is the usual clevis. Pivoted midway between the bearings for the shaft B and the downwardly-projecting post D is the handle E, having suitable hand-holds, $e$. Two bent pieces, F, having at their lower ends furrow-covering blades $g$, are pivoted to the handles at $f$, and connecting-links G, for regulating the depth of the covering-blade, are pivoted to the handles E at $f'$, and adjustably secured to the pieces F by pins $f^2$, adapted to be passed through any of the holes in the pieces F. If any rubbish—weeds, and the like—drag with the furrow-coverer $g$, the latter may be raised without disturbing the wheels by moving the handles in the direction of the arrow, Fig. 1.

The pivot pin or shaft $a$ also carries the hopper or box H, containing the seeds. In the lower end of this box is an agitating or feed wheel, I, of the form best observed in Figs. 2 and 4. The wheel is formed of two parts, leaving an opening, $i'$, between the said parts, for a purpose described hereinafter. This wheel I is driven from the shaft B, eccentrics $b$ on the shaft B acting on rods $j$, which are connected to pivoted levers J, carrying spring-pawls $j'$, Fig. 3. These pawls engage with ratchet-teeth $i$ on each end of the wheel I, Fig. 2. The eccentrics are set opposite to each other, so that as one pawl is moving the wheel forward the other pawl is recovering, thus keeping up a constant movement of the wheel I in the direction of its arrow, Fig. 4.

The eccentrics are adjustable on the shaft B, for the purpose of increasing or decreasing the speed of the wheel I, the construction of the adjusting device being described hereinafter.

The wheel I is of such diameter that it will not come into contact with the bottom layer of seeds in the box H, and preferably a space equal in height to about three layers of seed is left between the under side of the wheel and the bottom of the box, so that as the wheel revolves it will not crush the seeds. In the bottom of the box H is a slot, M, which I prefer to make of the T shape shown in Fig. 6. The points $m$ $m$ of this slot are raised sufficiently to detain a seed, or rather guide the seed into the portion $m'$ of the slot in the rear of the points M. In place of the projecting corners m, pins may be used. Any suitable cup may be used to catch the seed as it comes from the box through the slot M; but I prefer the cup and device connected therewith, which I will now proceed to describe.

N is a bar, preferably a casting, which is secured to the under side of the casing of the box H by a set-screw, $n$, with a pin, $n'$, to keep the bar steady. This bar N has bearings for a rock-shaft, K, at one end, and for a shaft, L, at the other end. A spring-cup, P, is secured to the bar, the cup portion being formed as shown in Fig. 7, and adapted to fit directly under the slot M in the casing of the box H. The cup is slotted, as shown, in order that the T-shaped blades $l\,l$, Fig. 2, on the shaft L may pass through the cup P, forcing the outer flexible edge of the cup down and forcing out the seeds contained in the cup. An intermittent motion is imparted to the shaft L, carrying these blades $l$, the shaft turning one-half a revolution at a time. The cup P may, if desired, be pivoted, as shown by dotted lines in Fig. 4, with a counter-weight, P', to tend to keep its outer end against the bottom of the box H.

On each end of the wheel I, which, as before described, is made in two parts, are projections or cams $h\,h$, which act on fingers $k\,k$, secured to the rock-shaft K. There is also secured to this shaft K an arm, $k'$, which has at its outer end a rack, $k^2$, gearing into a half-pinion, $l'$. This pinion forms part of a disk, $l^2$, loose on the shaft L, but connected thereto by a pivoted pawl, $l^3$, which acts on a ratchet-wheel, $l^4$, secured to the shaft L, Figs. 2 and 5. A spring, $n^2$, secured at one end to the shaft K, passes under the arm $k'$ and tends to keep it in the position shown in Fig. 3.

By the above-described devices, as the projections $h$ on the outer faces of the wheel I come into contact with either of the fingers $k$ on the rock-shaft K, the arm $k'$ will move in the direction of its arrow to the position shown by dotted lines, Fig. 3. This movement will, through the medium of the rack $k^2$ and the pinion $l'$ on the shaft L, force one of the blades $l$ into and through the cup P. As soon as the projection $h$ leaves the finger $k$ the spring $n^2$ returns the arm $k'$ and fingers $k$ to their normal positions, and the rack $k^2$ also returns the pinion $l'$, the pawl $l^3$ slipping over the ratchet-teeth on the wheel $l^4$. The shaft L is sufficiently tight in its bearings to prevent it from turning back by friction, or in some cases a pawl and ratchet may be used to prevent the shaft from turning except in one direction.

I will now describe the devices for adjusting the eccentric $b$, reference being had to Figs. 3, 4, and 8. The eccentrics $b\,b$ each lie between two disks, $p\,p'$. The disks $p$ are fast to the shaft B, while the two disks $p'$ form part of a sleeve, Q. Each disk $p$ has a pin, $q$, Fig. 3, on which the eccentric pivots when adjusting, and each disk $p'$ has a pin, $q'$, adapted to a slot, $b'$, in the eccentric. The eccentric is also slotted at $b^2$ for its free movement over the shaft B. By turning the sleeve Q, and consequently the disks $p'$, the center of the eccentrics can be moved nearer to or farther from the shaft B. To turn this sleeve accurately, I cut a straight slot in the shaft B, as shown by dotted lines in Fig. 8, and a spiral slot in the sleeve Q, and pass a pin, $s$, through both slots, said pin being also passed through and secured to a ring, $s'$, which is adjustably secured to a fixed index-plate, R, by plate $s^2$ and bolt and nut $s^3$. By moving the plate $s^2$ (which has a pointer) over the index-plate R, the sleeve Q can be turned on the shaft B to give the eccentric $b$ any throw required, thus regulating the throw of the feed-pawl arm J, and consequently the distance apart of the successive plantings.

The operation of the machine is as follows: The box H is filled with seed, and as the machine travels forward the eccentrics on the shaft or axle B revolve the wheel I in the direction of its arrow, Fig. 4, to the extent determined upon by the operator in setting the machine before planting. The projections $h$ on the wheel I come into contact with the arm $k$ on the rock-shaft K, moving the arm $k'$ to the position shown by dotted lines in Fig. 3, and the spring $n^2$ returns the arms $k\,k'$ back to their original positions. This movement of the arm $k'$ is transmitted to the shaft L, which is so geared to the arm $k'$ that it will revolve at each movement one-half of a revolution, and the T-shaped arms L of this shaft will pass in their revolution through the cup or receptacle P, situated below the T-slot M in the seed-box. As the wheel I revolves it creates a slight pressure on the seed, but not enough to cause the seed to choke, but merely to keep them in motion. As the seeds are carried around in the box the wings $m\,m$ serve to engage with certain of the seeds and direct them through the slot M and into the feed-cup P. As shown, as this cup is filled with seed there is no further forcing of seed into the cup, for, owing to the central chamber of the wheel L, there is no direct action upon the seed in line with the slot tending to force them through said slot; hence there can be no such packing of seeds in the feed-cup as will interfere with the proper action of the ejecting-arms $l$, by which the seeds are delivered from the cup at appropriate intervals. I do not limit myself to this peculiar T-slot M, as a Y-slot may be used, as shown in Fig. 9, or, in fact, a straight slot, as shown in Fig. 10, with an edge upturned, may be employed; but I have found that the best results can be obtained by using the T-slot.

Figure 11:
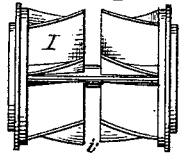
Figure 12:
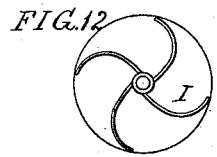
Figure 13:
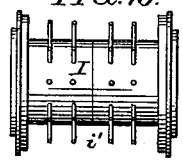
Figure 14:
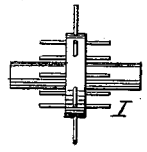
Figure 15:
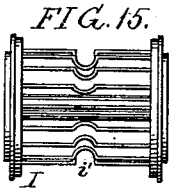
Figure 16:
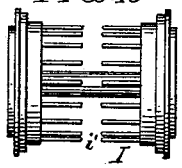

In Fig. 11 I have shown a feed-wheel, I, with the blades bent or curved or in the form of a double screw, with the space $i'$ between the two screws. This form of blade forces the seeds toward the center of the machine.

The wheel I (shown in Fig. 12) is formed of yielding blades, so that when the wheel revolves they will gently force the seed forward.

Figs. 13, 14, 15, and 16 illustrate feed-wheels, all of similar construction but provided with wire blades, as will be readily seen.

Figs 17, 18, and 19 illustrate different constructions of the cup P, and devices for imparting motion thereto.

Fig. 17 illustrates a machine with a rotating feed-cup under the slot M, and geared to the main shaft, as shown, the arms $l$ being thus dispensed with.

Figs. 18 and 19 illustrate an intermittent feeding-machine with a vibrating cup, P, secured to one end of a lever, $k'$, the other end being operated by a face cam, $w$, on the shaft K. This cup may have a forward movement, as shown in Fig. 19, by mounting the cup on a pivoted lever, $r$, which is vibrated by the projections $h$ coming into contact with a pin on a lever, $r'$, connected to the lever $r$.

Fig. 20 is a view of the machine where a plain feed-wheel, I, is used, and having V-shaped guides $y\ y$ secured within the rear side of the feed-casing, tending to guide the seeds toward the center opening, M.

Figs. 21 and 22 are views of a single-wheel machine—that is, a machine having only one traction-wheel, C—which travels a trifle to one side of the furrow marked out by the point $d$, the seeds in this case dropping from the cup at the side of the wheel. This machine has only one eccentric, which is connected to a sliding block, J′, being provided with two links connecting the block J′ to arms J, having pawls $j'$, one acting on the wheel on its downward movement and the other on its upward movement, so that the same result is obtained as with the devices shown in Figs. 1 and 3. This machine is advantageous where sharp corners have to be turned, and where it is inconvenient to use a two-wheel machine.

Fig. 23 is a view of a form of driving-gear by which the adjustable cams are dispensed with and a double rack, R, and pinion R′ are employed with a segmental gear, T, to which the rack is adjustably connected, and a pinion gearing into said segmental gear, and having a pawl, J, which engages with the teeth $i$ of the wheel I.

I claim as my invention—

1. The combination of the seed-box and a device for causing the seeds to move therein, with a delivery-opening having on the forward side a fixed wing projecting into the box, whereby as the seeds are moved forward across the opening they are caught by said fixed wing and guided into the opening, all substantially as specified.

2. The combination of the seed-box having an outlet-opening, wings or projections for guiding the seeds into said opening, and a wheel having a recess or chamber in line with the opening, all substantially as specified.

3. The combination of the seed-box and a device for causing the seeds to move therein, with a T-shaped slot having upturned guide-wings at the junction of the two portions of the slot, all substantially as specified.

4. The combination, in a seed-planter, of the seed-box having a delivery-opening and a device for causing the seeds to pass through said opening, with a feed-cup receiving the seeds from the box, and a device for ejecting the seeds from said cup, all substantially as specified.

5. The combination of the seed-box, the wheel I, having ratchet-teeth, the driving-shaft having an eccentric, the lever J, having a pawl engaging with the ratchet-teeth of the wheel I, and a rod connecting said eccentric and lever, all substantially as specified.

6. The combination of the seed-box having a discharge-slot, the external slotted feed-cup having an elastic support, and the ejecting-arm adapted to pass through the slot of the cup and depress the same, in order to eject the seed, all substantially as specified.

7. The combination of the seed-box having a discharge-opening, with an external feed-cup, an arm for ejecting the seed therefrom, and mechanism for operating the arm, said feed-cup and ejecting devices being carried by a bar detachable from the seed-box, all substantially as specified.

8. The combination of the ejector-shaft and its arms, the shaft K, having arms $k\ k'$, the wheel I, having projections acting on the arm $k$, and mechanism whereby the movement of the arm $k'$ is transmitted to the ejector-shaft so as to partially rotate the same, all substantially as specified.

9. The combination, in a seed-planter, of seed-feeding devices with an operating-shaft and an eccentric connected to said seed feeding devices and adjustable on the shaft to vary its throw, all substantially as specified.

10. The combination of the driving-shaft, a fixed disk thereon, an eccentric pivoted to said disk, a loose disk connected to the eccentric and serving to adjust the same, a scroll-sleeve connected to said loose disk, and an adjustable pin adapted to the slot in said sleeve, all substantially as specified.

11. The combination of the feed-box having a delivery-slot with a seed moving wheel recessed or chambered in line with said slot, and with means, substantially as described, whereby the seeds are directed toward said recess or chamber of the wheel as the latter rotates, all substantially as specified.

12. The combination of the fixed frame of the machine, the covering-blades, and their pivoted arms, and the guide handles E, pivoted to the fixed frame and connected to the pivoted arms of the covering-blades, all substantially as specified.

In testimony whereof I have signed my name to this specification in the presence of two subscribing witnesses.

GEORGE F. JOHNSON.

Witnesses:
WILLIAM D. CONNER,
HARRY SMITH.